United States Patent

Feinleib et al.

[15] 3,696,344

[45] Oct. 3, 1972

[54] OPTICAL MASS MEMORY EMPLOYING AMORPHOUS THIN FILMS

[72] Inventors: Julius Feinleib, Birmingham; Robert F. Shaw, Bloomfield Hills, both of Mich.

[73] Assignee: Energy Conversion Devices, Inc., Troy, Mich.

[22] Filed: Feb. 19, 1970

[21] Appl. No.: 12,622

[52] U.S. Cl.....340/173 LM, 340/173 LT, 350/160 R

[51] Int. Cl..........G11c 13/04, G02f 1/30, G02f 1/36

[58] Field of Search....340/173 LS, 173 LT, 173 LM, 340/173 CC; 350/160 R

[56] References Cited

UNITED STATES PATENTS

| | | | |
|---|---|---|---|
| 3,253,497 | 5/1966 | Dreyer | 340/173 LS |
| 3,530,441 | 9/1970 | Ovshinsky | 340/173 LS |
| 3,506,929 | 4/1970 | Ballman | 350/160 |
| 3,466,616 | 9/1969 | Bron | 340/173 CC |
| 3,174,140 | 3/1965 | Hagopian | 340/173 LT |
| 3,365,706 | 1/1968 | King | 340/173 LT |
| 3,475,736 | 10/1969 | Kurtz | 340/173 LS |

*Primary Examiner*—Bernard Konick
*Assistant Examiner*—Stuart Hecker
*Attorney*—Edward G. Fiorito

[57] ABSTRACT

This optical mass memory utilizes an amorphous semiconductor thin film which can be switched between a generally amorphous or disordered state and a crystalline or more ordered state by applying a laser beam. The laser beam is modulated and scanned across the amorphous film to record and erase information by switching the state of certain regions of the film. The same laser beam modulator and scanner can be used to read the information stored on the film by detecting whether the film is in the amorphous or crystalline state at any given location. The laser beam is composed of at least two frequencies, one of which is absorbed by the amorphous film and is used to write and also erase information on the film. The amorphous film is transparent to the other frequency and the transmission of this frequency is used to determine whether the film is in the crystalline or amorphous state at any given location thereby reading out the information recorded therein.

2 Claims, 5 Drawing Figures

INVENTOR.
JULIUS FEINLEIB
ROBERT F. SHAW
BY
Edward G. Fiorito
ATTORNEY

INVENTOR.
JULIUS FEINLEIB
ROBERT F. SHAW
BY
Edward G. Fiorito
ATTORNEY

OPTICAL MASS MEMORY EMPLOYING AMORPHOUS THIN FILMS

The present invention may be employed in data processing systems to store large quantities of data, and to randomly or serially access the data to retrieve the information for processing, transmission or other purposes. Optical mass memories have been found to be suitable for storage of large quantities of data because the data bits can be packed close together providing a high density storage, and because the memory can be optically read at high speeds. The recording medium quite often used in optical mass memories is photographic film. This film has high resolution and can record large quantities of data bits, but must be developed using chemical processes and cannot be altered once the film is exposed and developed. More recently magnetic recording media have been proposed for use in optical mass memories. The magnetic polarization of this type of media is switched by a laser beam. However the switching must take place in the presence of a magnetic field which determines the polarity which the magnetic media will assume.

Co-pending application Ser. No. 791,441 now U.S. Pat. No. 3,530,441 and entitled "METHOD AND APPARATUS FOR PRODUCING, STORING, AND RETRIEVING INFORMATION" by Stanford R. Ovshinsky which is a continuation-in-part of application Ser. No. 754,607 now abandoned discloses and claims an optical memory utilizing amorphous semiconductor materials as the memory film. The material is switched between a generally amorphous or disordered state and a crystalline or more ordered state in response to a laser beam. Each of these states exhibit a different index of light refraction, surface reflectance, light absorption, light transmission, particle or light scattering and the like. By sensing one or more of these electromagnetic properties the information stored in the semiconductor film can be retrieved. The present invention is directed to an improvement upon the invention disclosed in application Ser. No. 791,441 which permits a single source of electromagnetic energy to be used for performing three different functions on the memory film, writing, erasing, and reading. Additionally, a single beam scanning system can be used for these three functions.

In accordance with the present invention, a source of energy, such as a laser or electron beam, is directed against a memory material which exhibits at least two stable states. The material is switched between these two stable states depending upon the amount of energy absorbed by the material. The energy source is capable of delivering at least one frequency component which is absorbed by the memory material, in both states, and another frequency component which is transmitted through the memory material to a detector. When the material is in one state the detector collects a large amount of energy, and when the material is in the other state the detector collects only a small amount or no energy. By regulating the amount of energy content in the absorbed frequency, the material is made to switch between stable states.

In this manner a single energy source having at least two frequency components and a single beam scanning system can be used to perform writing, erasing, and reading functions. Additionally in accordance with the present invention, reading can be accomplished at the same time data is recorded or erased, thereby providing an error checking facility to insure that data has been properly recorded on the semiconductor film.

In accordance with another feature of the present invention the mode of operation of the system can be shifted from the write, erase, and read modes by a simple intensity modulator which attenuates the total intensity of the laser beam, for example, into three different intensity levels.

Other advantages and features of this invention will be apparent to those skilled in the art upon reference to the accompanying specification, claims and drawings in which:

Figure 4:
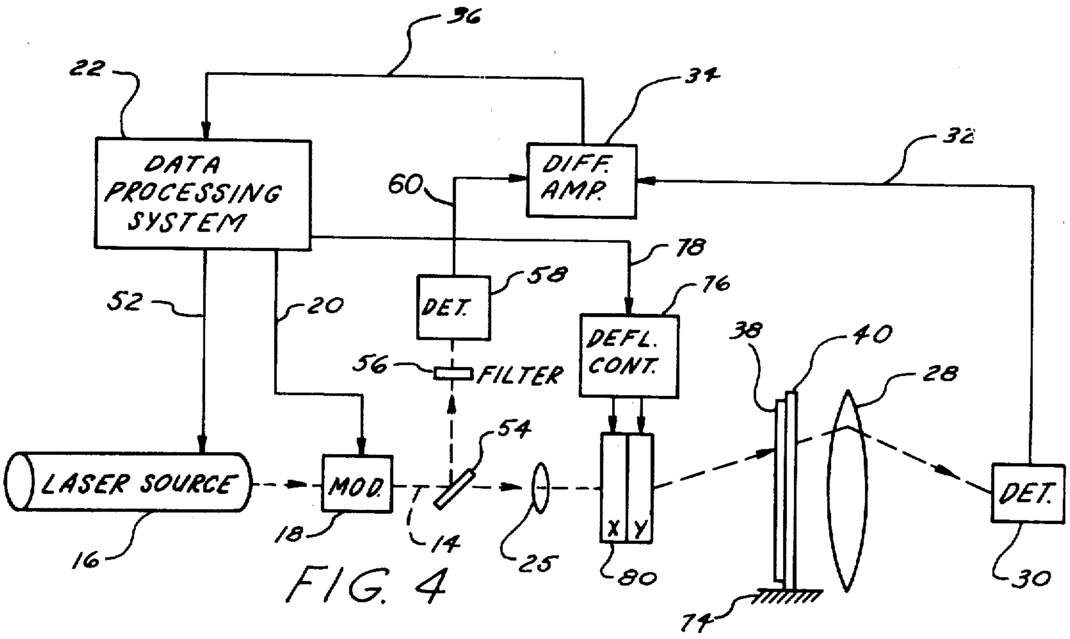
Figure 5:
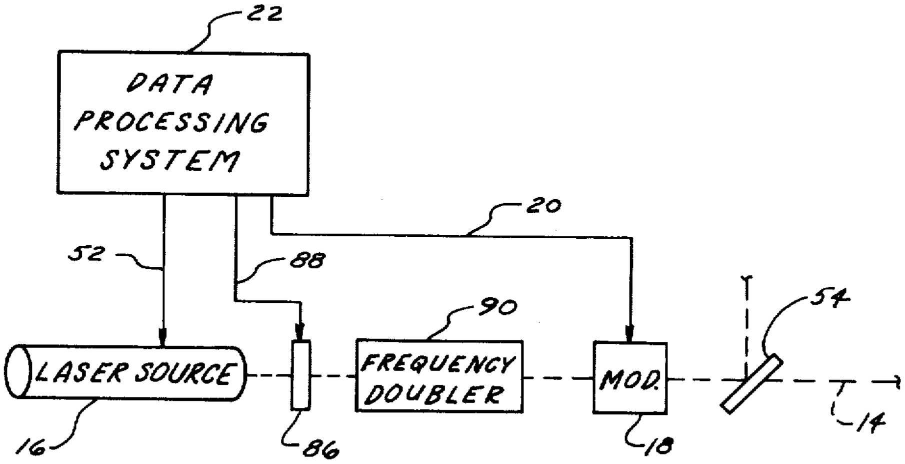

FIG. 4 is a schematic diagram illustrating another embodiment of the present invention employing a stationary amorphous semiconductor memory material and a two dimensional deflection system for directing a laser beam onto the memory material; and FIG. 5 is a partial schematic diagram of a portion of a system in which the frequency of a laser source is shifted to achieve writing, erasing and reading modes of operation in accordance with the present invention.

Figure 1:
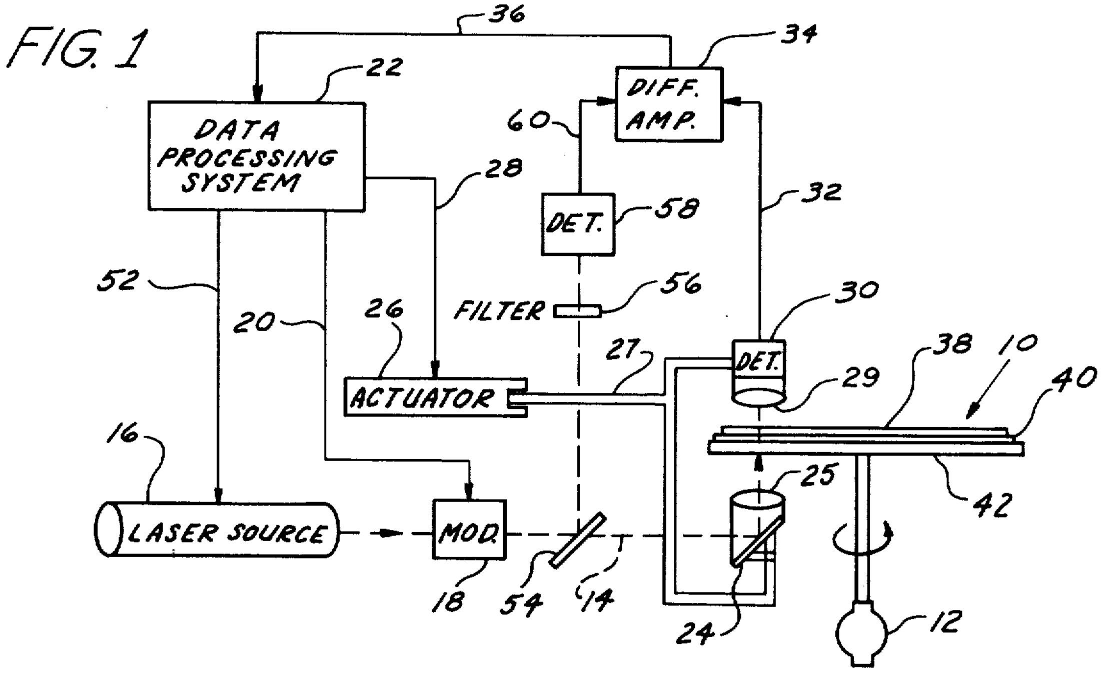
FIG. 1 is a schematic diagram illustrating one system embodying the present invention in which a rotating disc supports an amorphous semiconductor memory material.

The optical mass memory system of FIG. 1 employs a rotating memory disc 10 driven at a constant speed by a motor 12. A laser beam 14 is applied to the memory disc 10 by a laser source 16. The laser beam 14 is modulated by a modulator 18 which is operated by signals on a line 20 provided by a data processing system 22. The data processing system 22 contains the data to be stored on the memory disc 10. The data is usually in the form of binary digits represented by spots (not shown) recorded on the memory disc 10.

The information is retrieved from memory disc 10 by utilizing laser beam 14. The beam 14 is directed onto the memory disc 10 by a mirror 24 which is translated parallel to the plane of memory disc 10 by an actuator 26 and arm 27 operated in response to signals on a line 28 provided by data processing system 22. By synchronizing the movement of actuator 26 and the speed of rotation of memory disc 10 certain regions of the memory disc 10 may be scanned by laser beam 14 which passes through the memory disc 10. A lens 25 focuses the laser beam onto memory disc 10 and a lens 29 focuses the laser beam 14 emerging from memory disc 10 onto a detector 30. The detector 30 determines the changes which the laser beam 14 has undergone during transmission through the memory disc 10 applying a signal on a line 32 connected to a differential amplifier 34. The detector 30 is connected to the actuator arm 27 so as to be located over the laser beam 14. The operation of differential amplifier 34 will be described in more detail below. The output of differential amplifier 34 is supplied to data processing system 22 through a line 36. The data processing system 22 may use the signals retrieved from memory disc 10 to transmit the information to remote locations, process the information for business on scientific purposes, or handle the information for any other purposes, including re-recording the same or modified information on memory disc 10.

The upper surface of the disc 10 is composed of an amorphous semiconductor film 38. This film 38 is capable of being reversibly switched between two stable states. In one state the material is in a crystalline or more ordered state, while in the other state the material is in a generally amorphous or disorder state. Each of these states exhibits a different index of refraction, surface reflectance, electromagnetic absorption and transmission characteristic and particle or light scattering properties. The optical properties as well as the electrical properties of amorphous semiconductors are described in co-pending application Ser. No. 791,441 and also in U.S. Pat. No. 3,271,591 entitled "SYMMETRICAL CURRENT CONTROLLING DEVICE" by S. R. Ovshinsky issued Sept. 6, 1966. Amorphous semiconductor materials suitable for use in the present invention are described in U. S. Pat. No. 3,271,591 as Hi-Lo, Circuit Breaker and Mechanism device with memory. One example of an amorphous film 38 found to be suitable for operation in accordance with the present invention is Se 92 percent, Te 8 percent. Other percentages of Se and Te may be used, for example, Se (50–100 percent) Te (0–50 percent) plus small amounts of metallic elements.

Figure 2:
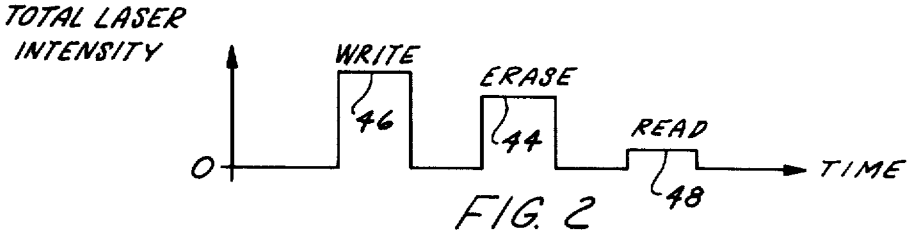
FIG. 2 is a wave form diagram illustrating the intensity of the laser pulses used to write, erase, and read information on the amorphous semiconductor memory material employed in FIGS. 1 and 4.

The film 38 is readily deposited on a glass substrate 40 or other transparent substrate. A thickness for film 38 of about 4 micrometers has been found to be suitable for operation in accordance with the present invention. The glass substrate 40 is mounted on a structural support member 42 which may also be made of glass or any other material which is transparent to the laser beam 14 and provides the structural support necessary during rotation of the memory disc 10. The film 38 may be exposed to the laser radiation on the top surface or at the substrate interface, as shown, which is preferable. The laser beam 14 which contains at least two frequency components for read, write and erase modes arrives at disc 10 in the form of pulses having three different levels of intensity. FIG. 2 illustrates these three different levels of intensity. The highest level pulse is labelled write and designated 46 in FIG. 2. A pulse 44 of intermediate intensity is used for the erase operation in the mass memory system of FIG. 1. A read pulse 48 is illustrated in FIG. 2 to have the lowest intensity.

The write and erase pulses 46 and 44 are used to switch the film 38 between two stable states. The write pulse 46 produces a crystalline or more ordered condition in the film 38 at the point where the laser beam 14 is focused on the film 38. The width of pulse 46 may be from about 0.01 to 100 $\mu$sec and have an energy content which need not be more than about 1 microjoule. The erase pulse 44 is used to switch the film 38 into the amorphous or generally disordered state and may have a pulse width the same as write pulse 46 and an energy content of about 25 percent of the write pulse 46. Read pulse 38 is shown to have a width similar to pulses 44 and 46. The intensity and energy content of read pulse 48 should be sufficiently low so that the point on film 38 at which the read pulse 48 is focused remains in either the crystalline or amorphous state after read pulse 48 is applied. A typical energy content for read pulse 48 found to be suitable for the present invention may be less than 25 percent of the write pulse 46 in the mode of operation where the read, write and erase frequencies are not separated.

Laser source 16 produces pulses under control of signals from data processing system 22 on a line 52. The laser source 16 may include a gas laser as for example Argon, or mixed gases such as Argon and Krypton. A typical range of peak power of such a gas laser is 0.1 to 2 watts depending on the efficiency of the optical system and pulse duration. A solid state laser with multiple frequency beam may also be used, or alternately a laser that can operate separately at at least two frequencies is suitable. Further, two laser sources may be used providing a single beam composed of at least two frequencies. Pulses from laser source 16 produce a series of pulses at constant amplitude which pass through modulator 18. The modulator 18 attenuates the intensity of the pulses producing one of the three levels of intensity illustrated in FIG. 2. The beam 14 emerges from modulator 18 and is applied to a beam splitter 54 which deflects a portion of the beam onto a filter 56 and a detector 58 which supplies a signal on a line 60 to differential amplifier 34. The operation of filter 56 and detector 58 will be described in more detail below. The portion of the laser beam 14 passing through beam splitter 54 is deflected by mirror 24 onto film 38. As described above the position of mirror 24 and the rotational position of disc 10 determines the particular point on film 38 where the laser beam is directed at any given instant of time.

Figure 3:
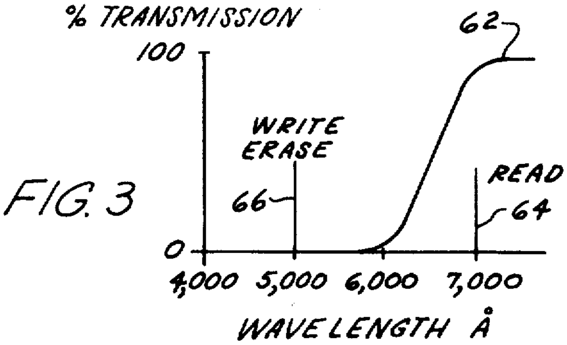
FIG. 3 is a graph illustrating the transmission characteristics of the amorphous semiconductor memory material for wavelengths of energy ranging from 4,000 angstroms to over 7,000 angstroms.

The laser beam 14 emerging from laser source 16 contains a plurality of frequency components. The particular laser used to produce these frequency components is selected on the basis of the absorption and transmission characteristics exhibited by the film 38. FIG. 3 illustrates a typical graph for the transmission characteristics of an amorphous semiconductor. The wavelength of the electromagnetic energy applied to the amorphous semiconductor is plotted along the abscissa, and the percent of energy that passes through the amorphous semiconductor is plotted along the ordinate. A curve 62 is representative of the transmission characteristics of a typical amorphous semiconductor material which is suitable for use in the present invention. A sharp rise in the transmission characteristics of the amorphous semiconductor is illustrated in FIG. 3 to occur around 6,500 angstroms, and is referred to herein as the absorption edge. Electromagnetic energy of wavelength shorter than the absorption edge is absorbed by the amorphous semiconductor material. Electromagnetic energy of wavelength longer than the absorption edge is transmitted through the amorphous semiconductor material. Accordingly, laser energy at frequencies having a shorter wavelength than 6,500 angstroms is absorbed in the amorphous film 38 producing heat and exciting electrical carriers to conduct. Laser energy of frequencies having wavelengths longer than 6,500 angstroms passes through the amorphous semiconductor film 38 and produces relatively little heat or carrier excitation therein. For various amorphous semiconductor compositions the curve 62 will appear different from that illustrated in FIG. 3. The absorption edge may occur at different wavelengths than the 6,500 angstroms illustrated in FIG. 3. Also, the rise in transmission may be more gradual than the steep slope illustrated in FIG. 3. Regardless of the particular shape of the absorption edge, a material may be suitable for use in the present invention if at least one frequency component can be generated at a wavelength larger than the absorption edge and another frequency component can be generated at a wavelength smaller than the absorption edge. Typical examples of frequency components are illustrated in FIG. 3 as a read frequency component 64 having a wavelength of 7,000 angstroms and a write and erase frequency component 66 having a wavelength of 5,000 angstroms.

In operation a laser beam 14 composed of the two frequency components 64 and 66 is applied to the film 38. The read component 64 passes through the film 38 producing substantially no effect thereon. The write and erase component 66 is absorbed by the film 38 and switches the state of the film 38 as a function of the intensity of the energy in laser beam 14. As illustrated in FIG. 2 if the intensity of the laser beam 14 is equal to the intensity of pulse 46 the film 38 switches to the crystalline or more ordered state thereby writing a binary bit of information at that point on the film 38. If it is desired to erase this bit of information, modulator 18 is adjusted by signals on line 20 from data processing system 22 to permit a lower intensity laser beam 14 to be applied to film 38 at this point. The intensity may be equal to pulse 44. This causes the film 38 to switch to the generally amorphous or disordered state thereby erasing the binary bit of information. Read out is accomplished by adjusting modulator 18 to pass the lowest level of intensity illustrated by pulse 48. The write and erase frequency component 66 included in read pulse 48 is insufficient to switch the state of the film 38. The read frequency component 64 of pulse 48 passes through film 38 and is collected by detector 30. The amount of energy collected by detector 30 when laser beam 14 passes through a portion of film 38 which is in the crystalline or more ordered state is less than the amount of energy collected by detector 30 when the same laser beam 14 passes through a region of film 38 which is in the amorphous or disordered state. This may be due to any one or all of the changes in electromagnetic properties the film 38 exhibits when switched from one stable state to the other, such as the index of refraction, surface reflectance, electromagnetic absorption and transmission characteristics and particle or light scattering properties. The detector 30 generates a signal proportional to the amount of energy collected after the laser beam 14 passes through the memory disc 10. This signal is fed to one input of differential amplifier 34. The other input supplied to differential amplifier 34 is generated by a detector 58 which performs the same function as detector 30. The energy received by detector 58 passes through a filter 56 which may be, for example, composed of the elements of disc 10 with film 38 in the amorphous or disordered state. Therefore the signal on line 60 is equivalent to the signal on line 32 when laser beam 14 passes through a portion of the memory disc 10 where film 38 is in the amorphous or disordered state. Any differences between the signals on lines 60 and 32 are therefore produced by the crystalline or more ordered state of film 38. When different signals are applied to the inputs of differential amplifier 34 a signal is generated on output line 36 indicating that a binary bit of information is recorded on the memory disc 10 at a certain location determined by the position of actuator 26 and the rotational position of disc 10. Servo mechanism techniques may be used to position actuator 26, and clocking or synchronizing bits may be prerecorded on disc 10 to locate tracks of information recorded on the film 38 in accordance with well known techniques employed in optical mass memories.

The optical mass memory of FIG. 4 is similar to the one illustrated in FIG. 1, except for the beam scanning system. Like numbers are applied to similar elements in FIGS. 1 and 4. The amorphous semiconductor film 38 and glass substrate 40 are mounted on a support 74. A deflection control 76 operated in response to signals on a line 78 from data processing system 22 operates a two dimensional scanning system 80 which applies the laser beam 14 to certain regions of film 38. This system operates in a manner similar to the one illustrated in FIG. 1 except that no mechanical motion is imparted to the film 38 or detector 30. The film may be in the form of a rectangular surface having data bits stored in rows and columns and wherein each data bit is addressable by the scanner 80. In the system of FIG. 4 filter 56 has transmission properties similar to the combination of the scanner 80, substrate 40 and film 38 when in the amorphous state.

FIG. 5 illustrates a portion of a system embodying the present invention wherein the three modes of operation, write, erase and read are accomplished by shifting the frequency of the laser beam 14. Like numbers are applied to similar elements in FIG. 5 and FIGS. 1 and 4. An electro-optic polarizer 86 is inserted in the path of laser beam 14 between laser source 16 and modulator 18. The electro-optic polarizer 86 changes beam polarization in response to signals on a line 88 from data processing system 22 whenever the frequency of laser beam 14 is to be doubled. In this condition the laser beam 14 has suitable polarization for frequency doubling when it is applied to a non linear optical frequency doubler 90 which may be composed of lithium niobate for example.

Where an amorphous semiconductor material having a transmission characteristic such as that shown in FIG. 3 is employed as the memory film 38, the system of FIG. 5 produces a laser beam which may be shifted between two frequencies, one above the absorption edge and the other below the absorption edge. The system of FIG. 5 may be used in the systems in FIGS. 1 and 4. In this case the longer wavelength frequency may be used to read information from the memory film 38. When it is desired to write or erase information the electro-optic polarizer 86 changes beam polarization to that suitable for the frequency doubler 90 to operate. The laser beam 14 arriving at modulator 18 is doubled in frequency and therefore in the absorption region of the amorphous memory film 38. By controlling the operation of modulator 18 the intensity level of the laser beam can be made to vary between the write pulse level 46 and the erase pulse level 44 shown in FIG. 2. The system of FIG. 5 combines the technique of shifting the frequency and modulating the intensity of the laser beam to accomplish the read, write and erase functions of a mass memory system.

The optical mass memory system of FIGS. 1 and 4 can be operated to perform an error checking function during the write and erase operations. Since the read frequency component 64 is present when the write pulse 46 and erase pulse 44 are applied to the film 38, reading can be accomplished at the same time the film switches. Accordingly, a signal is developed as described above on line 36 indicating whether the particular point on film 38 receiving the laser beam is in the crystalline or amorphous condition. Although the read frequency component 64 has a higher intensity during the write and erase pulses 46 and 44, the beam splitter 54 directs a proportionate amount of this energy to detector 58 so that differential amplifier 34 operates independent of the amplitude of the laser beam as it emerges from modulator 18, and responds only to the difference between the signals on its input lines 60 and 32.

In the event it is desired to read the film 38 using a high intensity frequency component 64 the frequency doubling system of FIG. 5 may be employed, or a filter may be placed in the path of laser beam 14 to filter out the write and erase frequency component 66 during the read operation. Another modification may be made by employing a continuous laser which produces a continuous read frequency component 64 and an optical shutter which selectively generates write and erase pulses of frequency component 66.

It may be desirable in some applications of the present invention to utilize the read frequency component 64 to perform the erase function by raising the intensity of this component. Since the film 38 absorbs the read component 64 when in the crystalline or more ordered state, the film 38 can be switched to the amorphous or disordered state.

While the crystalline state of the amorphous semiconductor 38 was designated as the write state containing the binary information, a film 38 which is initially in the crystalline or more ordered state may be employed. In this modification of the present invention data bits would be written by changing selected points on the film to the amorphous or disordered state. Read out is accomplished by inserting an inverter in line 36, or by changing filter 56 to simulate the crystalline state of film 38.

While the system of FIG. 1 employs a mechanical actuator to obtain translational movement of the laser beam 14, a laser beam deflector similar to two dimensional deflector 80 in FIG. 4 having only a single dimension of deflection may be employed with a memory disc 10. In this case a series of detectors 30 may be employed, one for each track on the memory disc 10 and their outputs summed sequentially to form a signal on line 32. In this manner the only mechanical motion would be the constant rotation of memory disc 10. The amorphous semiconductor film 38 may also be deposited on a drum instead of the memory disc 10, or may be deposited on a flexible medium such as a tape which can be transferred from reel to reel.

A further modification may be made where it is desired to write, erase and read by reflecting the laser beam from the disc 10 instead of transmitting through it. This may be accomplished by placing detector 30 with appropriate filters on the bottom side of disc 10 so as to intercept light reflected from film 38. In this modification the write and erase frequency may also be used to perform the read function. Still another modification of the present invention could be made by substituting the laser beam 14 with another source of electromagnetic energy. More than two frequency components may be present in the electromagnetic source, and it may include a continuous spectrum of frequencies above and below the absorption edge of the film 38. Other types of electromagnetic sources suitable for use in the present invention are the line spectra emanating from gaseous discharges such as a mercury arc lamp.

The operation of the optical mass memories described herein can be modified by suitable programming in data processing system 22 to perform more than one operation at a single bit position on the memory film 38 before advancing the laser beam to the next bit position. For example, in some applications it may be desirable to read the data at a given bit position first and determine in which state the memory film 38 resides. Then if it is desired to switch the state, a write operation is executed. Following this, it may be desirable to perform an error check to determine whether the write operation was executed successfully. Accordingly, a read operation may be performed by the laser beam 14, and if the information stored on memory film 38 is correct, the beam 14 may be advanced to the next position.

While the present invention has been described with reference to recording digital information it is also possible to record analog or human readable information in accordance with the present invention. For this application the signal generated by detector 30 on line 32 may be applied to a cathode ray tube and the image produced on the face thereof. Alternatively, it is possible to view the information directly by transmitted or reflected light.

Numerous other modifications may be made to various forms of the invention described herein without departing from the spirit and scope of the invention.

What is claimed is:

1. A system for storing and retrieving information comprising:

a source for the provision of radiant electromagnetic energy in the form of a single beam comprising energy of at least a first frequency and energy of a second frequency;

a layer of semiconductor memory material capable of being reversibly switched between two stable structure states in response to the amount of energy applied thereto of said first frequency, and which material produces a different detectable effect upon energy of said second frequency applied thereto, depending upon the stable structure state in which said material resides;

one of said stable structure states being a generally amorphous or disordered state and the other stable structure state being a crystalline or more ordered state;

beam directing means for applying said single beam of electromagnetic radiation from said source to certain regions of said memory material;

control means for varying the amount of energy of said first frequency applied to said memory material by said beam directing means into at least three levels, a highest level sufficient to switch said memory material into one of said two stable structure states, an intermediate level sufficient to switch said memory material into the other of said two stable structure states, and a low level insufficient to switch said memory material; and detecting means, responsive to the effect said memory material produces upon energy of said second frequency applied to certain regions of said memory material by said beam directing means, for detecting the stable structure state of said memory material at said certain regions whereby the information stored in said memory material is retrieved.

2. The system as defined in claim 1 wherein said control means varies the amount of energy at said second frequency applied to said memory material by said beam directing means in a manner relatively proportional to the manner in which said control means varies said first frequency, and with sufficient energy of said second frequency in all three of said levels to permit said detecting means to detect the stable structure state of said memory material.

* * * * *